(12) United States Patent
van Oldenborgh et al.

(10) Patent No.: US 11,681,950 B2
(45) Date of Patent: *Jun. 20, 2023

(54) METHOD FOR CATEGORIZING A SCENE COMPRISING A SUB-SCENE WITH MACHINE LEARNING

(71) Applicant: Kepler Vision Technologies B.V., Amsterdam (NL)

(72) Inventors: Marc Jean Baptist van Oldenborgh, Amsterdam (NL); Henricus Meinardus Gerardus Stokman, Amsterdam (NL)

(73) Assignee: KEPLER VISION TECHNOLOGIES B.V., Amsterdam (NL)

( * ) Notice: Subject to any disclaimer, the term of this patent is extended or adjusted under 35 U.S.C. 154(b) by 310 days.

This patent is subject to a terminal disclaimer.

(21) Appl. No.: 17/099,474

(22) Filed: Nov. 16, 2020

(65) Prior Publication Data

US 2021/0073547 A1   Mar. 11, 2021

Related U.S. Application Data

(63) Continuation of application No. 16/160,948, filed on Oct. 15, 2018, now Pat. No. 10,839,220.

(51) Int. Cl.
| | |
|---|---|
| *G06N 20/00* | (2019.01) |
| *G06N 3/08* | (2023.01) |
| *G06V 20/00* | (2022.01) |
| *G06V 20/54* | (2022.01) |
| *G06F 18/214* | (2023.01) |
| *G06F 18/21* | (2023.01) |
| *G06V 10/25* | (2022.01) |
| *G06V 20/52* | (2022.01) |

(Continued)

(52) U.S. Cl.
CPC ............ *G06N 20/00* (2019.01); *G06F 18/214* (2023.01); *G06F 18/217* (2023.01); *G06N 3/08* (2013.01); *G06V 10/25* (2022.01); *G06V 20/36* (2022.01); *G06V 20/38* (2022.01); *G06V 20/52* (2022.01); *G06V 20/54* (2022.01); *G06V 20/56* (2022.01); *B25J 9/1697* (2013.01)

(58) Field of Classification Search
CPC ........ G06V 20/36; G06V 20/38; G06V 20/54; G06V 10/25; G06V 20/52; G06V 20/56; G06K 9/6256; G06K 9/6262; G06N 3/08; G06N 20/00; G06N 3/0454; G06N 7/005; G06N 3/045; G06N 7/01; B25J 9/1697; G06F 18/214; G06F 18/217
USPC ........................................................ 382/159
See application file for complete search history.

(56) References Cited

U.S. PATENT DOCUMENTS 9,830,561 B2 * 11/2017 Renaudie ............... G06V 20/62

* cited by examiner

*Primary Examiner* — Charlotte M Baker
(74) *Attorney, Agent, or Firm* — AEON Law, PLLC; Adam L. K. Philipp; David V. H. Cohen

(57) ABSTRACT

A method for identifying a scene, comprising a computing device receiving a plurality of data points corresponding to a scene; the computing device determining one or more subsets of data points from the plurality of data points that are indicative of at least one sub-scene in said scene, said at least one sub-scene displayed on a display device that is part of said scene, wherein said at least one sub-scene does not represent said scene; the computing device categorizing said scene, disregarding said at least one sub-scene, wherein the categorizing includes interpreting said scene by a computer (Continued)

vision system such that said at least one sub-scene is not taken into account in the categorizing of said scene.

12 Claims, 5 Drawing Sheets

(51) Int. Cl.
    *G06V 20/56*          (2022.01)
    *B25J 9/16*           (2006.01)

METHOD FOR CATEGORIZING A SCENE COMPRISING A SUB-SCENE WITH MACHINE LEARNING

CROSS-REFERENCE TO RELATED APPLICATIONS

This application is a continuation of U.S. patent application Ser. No. 16/160,948 filed Oct. 15, 2018, titled "Method for categorizing a scene comprising a sub-scene with machine learning," which is incorporated herein by reference in its entirety for all purposes.

FIELD OF THE INVENTION

The invention relates to a method, a system, a device, and a computer program product for training a machine learning model for categorizing a scene, a subject, a pose or an action in a video, an image, a series of images or a live stream.

BACKGROUND OF THE INVENTION

Artificial intelligence (AI) is developing rapidly and AI applications are supporting or will support all industries including the aerospace industry, agriculture, chemical industry, computer industry, construction industry, defense industry, education industry, energy industry, entertainment industry, financial services industry, food industry, health care industry, hospitality industry, information industry, manufacturing, mass media, mining, telecommunication industry, transport industry, water industry and direct selling industry.

Human-machine communication becomes more and more important. Machines (such as computers, smartphones, tablets and robots) are penetrating society rapidly.

Computer vision is an area of AI wherein machine learning can be used to classify scenes in images of living beings and objects having poses and showing actions.

US20160180189, with title "Image Scene Recognition", according to its abstract describes "Systems, methods, and computer program products may be directed to creating an image hash. Key points can be identified at different locations within a sample image. Descriptor vectors for the key points can be identified, the descriptor vectors describing local image information around the key points, where each descriptor vector is an n-dimensional array. Key points can be generated based on hashes of data vectors that include at least one of the descriptors, where each feature is a 36×20 hash value."

U.S. Pat. No. 8,189,866, with title "Human-action recognition in images and videos", according to its abstract describes "The present disclosure includes, among other things, systems, methods and program products applying a plurality of low-level feature detectors to an image where each low-level feature detector produces a respective low-level feature vector that represents a detection result. The low-level feature vectors are provided to a plurality of higher-level feature detectors where each higher-level feature detector produces a respective higher-level feature vector that represents a detection result based on a distribution of features in one or more of the low-level feature vectors. The higher-level feature vectors are then provided to a classifier in order to classify a human-action in the image."

US20100303303, with title "Methods for recognizing pose and action of articulated objects with collection of planes in motion", according to its abstract describes "The invention comprises an improved system, method, and computer-readable instructions for recognizing pose and action of articulated objects with collection of planes in motion. The method starts with a video sequence and a database of reference sequences corresponding to different known actions. The method identifies the sequence from the reference sequences such that the subject in performs the closest action to that observed. The method compares actions by comparing pose transitions. The cross-homography invariant may be used for view-invariant recognition of human body pose transition and actions."

US20090190798, with title "Provided are a system and method for real-time object recognition and pose estimation using in-situ monitoring. The method includes the steps of: a) receiving 2D and 3D image information, extracting evidences from the received 2D and 3D image information, recognizing an object by comparing the evidences with model, and expressing locations and poses by probabilistic particles; b) probabilistically fusing various locations and poses and finally determining a location and a pose by filtering inaccurate information; c) generating ROI by receiving 2D and 3D image information and the location and pose from the step b) and collecting and calculating environmental information; d) selecting an evidence or a set of evidences probabilistically by receiving the information from the step c) and proposing a cognitive action of a robot for collecting additional evidence; and e) repeating the steps a) and b) and the steps c) and d) in parallel until a result of object recognition and pose estimation is probabilistically satisfied."

US20030058111, with title "Computer vision based elderly care monitoring system", according to its abstract describes "A method for monitoring a person of interest in a scene, the method comprising: capturing image data of the scene; detecting and tracking the person of interest in the image data; analyzing features of the person of interest; and detecting at least one of an event and behavior associated with the detected person of interest based on the features; and informing a third party of the at least one detected events and behavior."

SUMMARY OF THE INVENTION

The invention allows a device, or a system, or a computer program product for running on a computing device to interpret a scene correctly.

Computer vision is a science that tries to understand what can be seen and what is happening in an image or series of images such as a photo picture, a video or a live stream. To that extend, machine learning can be used. An image contains a scene reflecting people, animals and/or objects often executing an activity. Current computer vision technology fails when a display device in a scene is showing a sub-scene. For instance, when computer vision should detect the number of people gathered in a hall, the people on various display devices such as billboards, posters and television screens should not be counted.

Hence, it is an aspect of the invention to provide an improved and/or alternative method for training machine learning models.

To that end, there is provided a method for categorizing an action in a scene, comprising:
a computing device receiving a plurality of data points corresponding to said scene;
the computing device determining one or more subsets of data points from the plurality of data points, wherein said one or more subsets of data points are indicative of at least one sub-scene in said scene, said sub-scene displayed on a display device;
the computing device categorizing said action in said scene, disregarding said a least one sub-scene.

There is further provided a device comprising an AI system for categorizing an action in a scene, said AI system comprising a computing device running a computer program performing:
receiving a plurality of data points corresponding to said scene;
determining one or more subsets of data points from the plurality of data points, wherein said one or more subsets of data points are indicative of at least one sub-scene in said scene, said sub-scene displayed on a display device;
categorizing said action in said scene, said computer program disregarding said a least one sub-scene.

There is further provided a computer program product for running on a computing device, performing:
receiving a plurality of data points corresponding to said scene;
determining one or more subsets of data points from the plurality of data points, wherein said one or more subsets of data points are indicative of at least one sub-scene in said scene, said sub-scene displayed on a display device;
categorizing said action in said scene, said computer program disregarding said a least one sub-scene.

It was found that display devices, such as televisions, (computer) screens, billboards, posters and other displays (such as prints on clothes and other fabrics) might be part of a scene while showing a sub-scene. When classifying a scene with computer vision, a sub-scene on a display device can have an impact on the classification of the scene and the elements within the scene. This impact is often noise which preferably is avoided when classifying and interpreting a scene.

The invention allows a device, or a system, or a computer program product for running on a computing device to interpret a scene correctly. Even when the scene comprises a display device showing a sub-scene.

In the current context, categorization take place and the at least one sub-scene is disregarded in the process of categorizing. This may be done before the actual categorizing is done. In an embodiment, this may also be done during, or while, the actual categorizing is done. This means within a functional timeframe during which the actual categorizing is done. In fact, the functional result is such that the sub-scene is not taken into account in the categorizing.

A subject can be living being, i.e. an animal or a person, or an object. A physical product is an example of an object, as is a car, a statue or a house.

A scene is a view or picture of a place with at least one subject. A scene can be a view or picture of an event, or activity.

An activity in an embodiment is a series of actions.

An action is a movement of a subject having trajectory.

A pose, as referred to in computer vision, is the position and orientation of a subject. A body of a living being has a pose. Also, a vehicle has a pose which can be defined by its position and orientation. The pose of a living being can be detected by articulated body pose estimation.

An image or a series of images or a time series of images can for instance result from a LIDAR, a visual light camera, a sonar imaging, a radar imaging, a laser imaging, or an infrared camera.

An image capturing device in an embodiment is a device that can provide an image or a series of images or a time series of images, in particular a digital image or digital picture. Such a device can comprise a camera of a filming (motion picture) device. Examples are devices comprising a CCD or similar imaging elements. Other examples of image capturing devices are a camera, a sonar, a radar, a laser, LIDAR and an infrared camera. As such, these devices are known to a skilled person.

A computing device is any machine for automatically executing calculations or instructions. A computing device might be a PC, a server, a cloud server, a locally distributed server environment, a computer cloud environment or any circuitry for performing particular functions in an electronic device.

A computing device may output a confidence value associated with one or more of the categories. Also, other means of determining a sub-scene, if any is being provided, are possible as well.

In some embodiments, once the computing device determines a categorization for the one or more subsets of data points, the computing device may store a given label associated with the determined category for the plurality of data points. The plurality of data points may then become part of the training data which may be used for future determinations of scenes and sub-scenes.

A computing device may identify patterns using the machine learning algorithm to optimize sub-scene detection, and/or scene detection in general. For instance, the machine learning algorithm may indicate that an average display device in a sub-scene is at least 350 square inches, a respective size of a given display device being a possible feature vector is utilized by the computing device (e.g. by the machine learning algorithm) to identify the average display device size.

Categorization may involve identifying to which of a set of categories (e.g. normal condition scene or emergency scene and/or allowed action or prohibited action and/or awkward pose or normal pose and/or ordinary object or out-of-the-ordinary object) a new captured scene may belong, on the basis of a set of training data with known categories, such as the aforementioned categories. Categorization of the one or more subsets of data points associated with a captured scene may be performed using one or more machine learning algorithms and statistical classification algorithms. Example algorithms may include linear classifiers (e.g. Fisher's linear discriminant, logistic regression, naive Bayes, and perceptron), support vector machines (e.g. least squares support vector machines), clustering algorithms (e.g. k-means clustering), quadratic classifiers, multi-class classifiers, kernel estimation (e.g. k-nearest neighbor), boosting, decision trees (e.g. random forests), neural networks, Gene Expression Programming, Bayesian networks, hidden Markov models, binary classifiers, and learning vector quantization. Other example classification algorithms are also possible.

The process of categorization may involve the computing device determining, based on the output of the comparison of the one or more subsets with the one or more predetermined sets of scene types, a probability distribution (e.g. a Gaussian distribution) of possible scene types associated with the one or more subsets. Those skilled in the art will be aware that such a probability distribution may take the form of a discrete probability distribution, continuous probability distribution, and/or mixed continuous-discrete distributions. Other types of probability distributions are possible as well.

In order to detect and localize a subject in a scene from a captured image an embodiment uses a method to detect subjects. Such a method will use machine learning techniques (mainly deep learning) to design and train a model which detects subjects given an input of a visual representation, e.g. an RGB image, as the system perceives. The model is trained on a large amount of annotated data; it comprises images with and without subjects and locations of the subjects are annotated.

In the case of deep learning, a detection framework such as Faster-RCNN, SSD, R-FCN, Mask-RCNN, or one of their derivatives can be used. A base model structure can be VGG, AlexNet, ResNet, GoogLeNet, adapted from the previous, or a new one. A model can be initialized with weights and trained similar tasks to improve and speedup the training Optimizing the weights of a model, in case of deep learning, can be done with the help of deep learning frameworks such as Tensorflow, Caffe, or MXNET. To train a model, optimization methods such as Adam or RMSProb can be used. Classification loss functions such Hinge Loss or Softmax Loss can be used. Other approaches which utilize handcrafted features (such as LBP, SIFT, or HOG) and conventional classification methods (such as SVM or Random Forest) can be used.

In order to detect and localize a living being in a scene from a retrieved image an embodiment uses a method to detect living beings. Such a method will use machine learning techniques (mainly deep learning) to design and train a model which detects living beings given an input of a visual representation, e.g. an RGB image, as the system perceives. The model is trained on a large amount of annotated data; it comprises images with and without living beings and locations of the living beings are annotated.

In the case of deep learning, a detection framework such as Faster-RCNN, SSD, R-FCN, Mask-RCNN, or one of their derivatives can be used. A base model structure can be VGG, AlexNet, ResNet, GoogLeNet, adapted from the previous, or a new one. A model can be initialized with weights and trained similar tasks to improve and speedup the training. Optimizing the weights of a model, in case of deep learning, can be done with the help of deep learning frameworks such as Tensorflow, Caffe, or MXNET. To train a model, optimization methods such as Adam or RMSProb can be used. Classification loss functions such Hinge Loss or Softmax Loss can be used. Other approaches which utilize handcrafted features (such as LBP, SIFT, or HOG) and conventional classification methods (such as SVM or Random Forest) can be used.

To detect bodily features, the system in an embodiment can determine key points on the body (e.g. hands, legs, shoulders, knees, etc.) of a living being.

To detect the key points on the body of a living being, in an embodiment the system comprises a model that is designed and trained for this detection. The training data to train the model comprises an annotation of various key points locations. When a new image is presented, the model allows identification of the locations of such key points. To this end, the system can utilize existing key point detection approaches such as MaskRCNN or CMU Part Affinity Fields. The training procedure and data can be customized to best match the context of the content of the retrieved images. Such context may comprise an indoor context (like a home, a shop, an office, a station, an airport, a hospital, a theatre, a cinema etc.) or an outdoor context (like a beach, a field, a street, a park etc.) wherein there are changing lighting conditions.

For example, a pretrained deep neural network (DNN) on ImageNet, e.g. VGGNet, AlexNet, ResNet, Inception and Xception, can be adapted by taking the convolution layers from these pretrained DNN networks, and on top of them adding new layers specially designed for scene recognition comprising one or more display devices, and train the network as described for the model. Additional new layers could comprise specially designed layers for action and pose recognition. All the aforementioned layers (scene recognition, pose and action recognition) can be trained independently (along with/without the pre-trained conventional layers) or trained jointly in a multi-task fashion.

In an embodiment, the scene is an indoor scene.

In an embodiment, the scene is an outdoor scene.

In an embodiment, the scene comprises a series of subsequent scenes defining said action.

In an embodiment, the action comprises a traffic action comprising at least one scene from a viewpoint inside a vehicle looking out of said vehicle.

There is provided an AI system comprising a computing device running the computer program product.

There is further provided an apparatus comprising the AI system, wherein said scene comprises a representation of a surrounding of said apparatus comprising said action, said AI system providing instructions to adjust at least one physical parameter of said apparatus based upon said categorizing of said action. Such a physical parameter comprises one of speed, direction, pose, position, and orientation in a space.

In an embodiment, such an apparatus comprises an image capturing device described above.

In an embodiment of the apparatus, it is selected from a vehicle and a robot system. Examples of a vehicle are an automobile, a cart, a train, a ship, a vessel, a submarine, an airplane, and a helicopter. Examples of a robot system comprise a drone, a robotic arm, a humanoid and autonomously operating constructions.

There is further provided a monitoring system comprising the AI system, wherein said scene comprises a representation of a surrounding of said monitoring system comprising said action, said AI system providing a signal based upon said categorizing of said action. In an embodiment, a signal comprises a notification, a control signal, a text message, an electromagnetic signal and an optical signal.

In an embodiment, such a monitoring system comprises an image capturing device.

In an embodiment, there is provided a surveillance system comprising the monitoring system described above.

The invention further relates to a method for categorizing a scene, comprising: a computing device receiving a plurality of data points corresponding to said scene; the computing device determining one or more subsets of data points from the plurality of data points, wherein said one or more subsets of data points are indicative of at least one sub-scene in said scene, said sub-scene displayed on a display device; the computing device categorizing said scene, disregarding said a least one sub-scene.

The invention further relates to a method for categorizing one or more subjects in a scene, comprising:

a computing device receiving a plurality of data points corresponding to said scene;

the computing device determining one or more subsets of data points from the plurality of data points, wherein said one or more subsets of data points are indicative of at least one sub-scene in said scene, said sub-scene displayed on a display device;

the computing device categorizing said one or more subjects in said scene, the computing device disregarding said a least one sub-scene.

The invention further relates to a method for categorizing a pose in a scene, comprising:
a computing device receiving a plurality of data points corresponding to said scene;
the computing device determining one or more subsets of data points from the plurality of data points, wherein said one or more subsets of data points are indicative of at least one sub-scene in said scene, said sub-scene displayed on a display device;
the computing device categorizing said pose in said scene, the computing device disregarding said a least one sub-scene.

The embodiments described earlier can be combined with any of the aforementioned methods described.

The term "statistically" when used herein, relates to dealing with the collection, analysis, interpretation, presentation, and organization of data. The analysis may be presented into visual formats like graphs, or other known graphical representations and/or tables.

The term "near real-time" or "nearly real-time" (NRT), in telecommunications and computing, refers to the time delay introduced, by automated data processing or network transmission, between the occurrence of an event and the use of the processed data, such as for display or feedback and control purposes. For example, a near-real-time display depicts an event or situation as it existed at the current time minus the processing time, as nearly the time of the live event.

The distinction between the terms "near real time" and "real time" is somewhat nebulous and must be defined for the situation at hand. The term implies that there are no significant delays. In many cases, processing described as "real-time" would be more accurately described as "near real-time". In fact, this may also be described as "functionally real-time".

Near real-time also refers to delayed real-time transmission of voice and video. It allows playing video images, in approximately real-time, without having to wait for an entire large video file to download. Incompatible databases can export/import to common flat files that the other database can import/export on a scheduled basis so that they can sync/share common data in "near real-time" with each other.

Real-time signal processing is necessary, but not sufficient in and of itself, for live signal processing such as what is required in live event support. Live audio digital signal processing requires both real-time operation and a sufficient limit to throughput delay so as to be tolerable to performers using stage monitors or in-ear monitors and not noticeable as lip sync error by the audience also directly watching the performers. Tolerable limits to latency for live, real-time processing is a subject of investigation and debate but is estimated to be between 6 and 20 milliseconds.

A real-time system has been described in Wikipedia as one which "controls an environment by receiving data, processing them, and returning the results sufficiently quickly to affect the environment at that time". The term "real-time" is also used in simulation to mean that the simulation's clock runs at the same speed as a real clock, and in process control and enterprise systems to mean "without significant delay".

The distinction between "near real-time" and "real-time" varies, and the delay is dependent on the type and speed of the transmission. The delay in near real-time is typically of the order of several seconds to several minutes.

Often, systems that are described or seen as "real-time" are functionally real-time.

Demography in general is the statistical study of populations, especially human beings (see Wikipedia). As a very general science, it relates to analysing any kind of dynamic living population, i.e., one that changes over time or space. Demography encompasses the study of the size, structure, and distribution of these populations, and spatial or temporal changes in them in response to birth, migration, aging, and death.

Demographic analysis can cover whole societies or groups defined by criteria such as education, nationality, religion, and ethnicity.

Formal demography limits its object of study to the measurement of population processes, while the broader field of social demography or population studies also analyses the relationships between economic, social, cultural, and biological processes influencing a population.

The common variables that are gathered in demographic research include age, sex, income level, race, employment, marital state, occupation, religion, location, home ownership and level of education. Demographics make certain generalizations about groups to identify customers. Additional demographic factors include gathering data on preferences, hobbies, lifestyle and more.

A camera is defined in for instance Wikipedia as an optical instrument for recording or capturing images, which may be stored locally, transmitted to another location, or both. The images may be individual still photographs or sequences of images constituting videos or movies. The camera is a remote sensing device as it senses subjects without any contact. Current cameras are in general digital image recording devices. A camera in general works with the light of the visible spectrum or with other portions of the electromagnetic spectrum. A still camera is an optical device which creates a single image of an object or scene and records it on an electronic sensor. A movie camera or a video camera operates similarly to a still camera, except it records a series of static images in rapid succession, commonly at a rate of 24 frames per second.

The term "substantially" herein, such as in "substantially all emission" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

The term "functionally" will be understood by, and be clear to, a person skilled in the art. The term "substantially" as well as "functionally" may also include embodiments with "entirely", "completely", "all", etc. Hence, in embodiments the adjective functionally may also be removed. When used, for instance in "functionally parallel", a skilled person will understand that the adjective "functionally" includes the term substantially as explained above. Functionally in particular is to be understood to include a configuration of features that allows these features to function as if the adjective "functionally" was not present. The term "functionally" is intended to cover variations in the feature to which it refers, and which variations are such that in the functional use of the feature, possibly in combination with other features it relates to in the invention, that combination of features is able to operate or function. For instance, if an antenna is functionally coupled or functionally connected to a communication device, received electromagnetic signals that are receives by the antenna can be used by the communication device. The word "functionally" as for instance used in "functionally parallel" is used to cover exactly parallel, but also the embodiments that are covered by the word "substantially" explained above. For instance, "functionally parallel" relates to embodiments that in operation function as if the parts are for instance parallel. This covers embodiments for which it is clear to a skilled person that it operates within its intended field of use as if it were parallel.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices or apparatus herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device or apparatus claims enumerating several means, several of these means may be embodied by one and the same item of hardware. The mere fact that certain measures are recited in mutually different dependent claims does not indicate that a combination of these measures cannot be used to advantage.

The invention further applies to an apparatus or device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which.

Figure 1A:
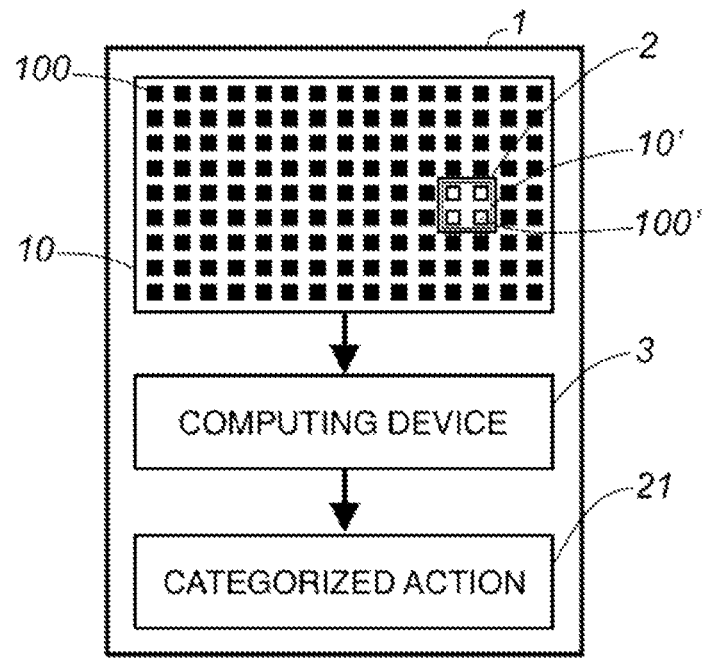
FIGS. 1A-D schematically depict flow charts of example methods to categorize various aspects from a scene comprising a display device.

The drawings are not necessarily to scale.

DESCRIPTION OF PREFERRED EMBODIMENTS

The following detailed description describes various features and functions of the disclosed systems and methods with reference to the accompanying figures. In the figures, similar symbols identify similar components, unless context dictates otherwise.

FIGS. 1A-D schematically depict flow charts of example methods (1, 1', 1" and 1''') for categorizing wherein a computing device 3 receives data points (100, 100') from scene 10, comprising a display device 2 and a sub-scene 10', resulting is a categorized action 21, a categorized scene 20 and one or more categorized subjects 22.

In FIG. 1A, method 1 categorizes an action in scene 10 resulting in a categorized action 21. Computing device 3 receives a plurality of data points 100 corresponding to scene 10. Computing device 3 determines a subset of data points 100' indicative of sub-scene 10' displayed on display device 2, and categorizes an action in scene 10 and disregards sub-scene 10'.

Figure 1B:
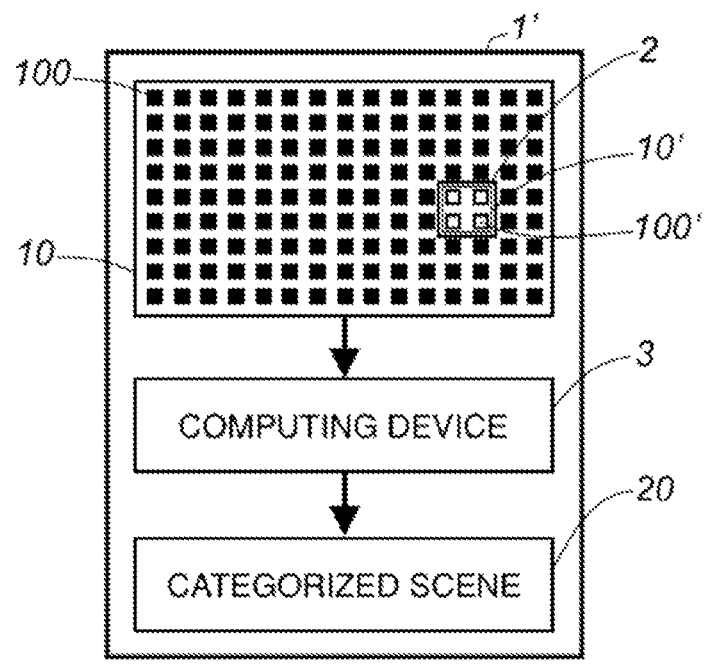

In FIG. 1B, method 1' categorizes a scene 10 resulting in a categorized scene 20. Computing device 3 receives a plurality of data points 100 corresponding to scene 10. Computing device 3 determines a subset of data points 100' indicative of sub-scene 10' displayed on display device 2, and categorizes scene 10 and disregards sub-scene 10'.

Figure 1C:
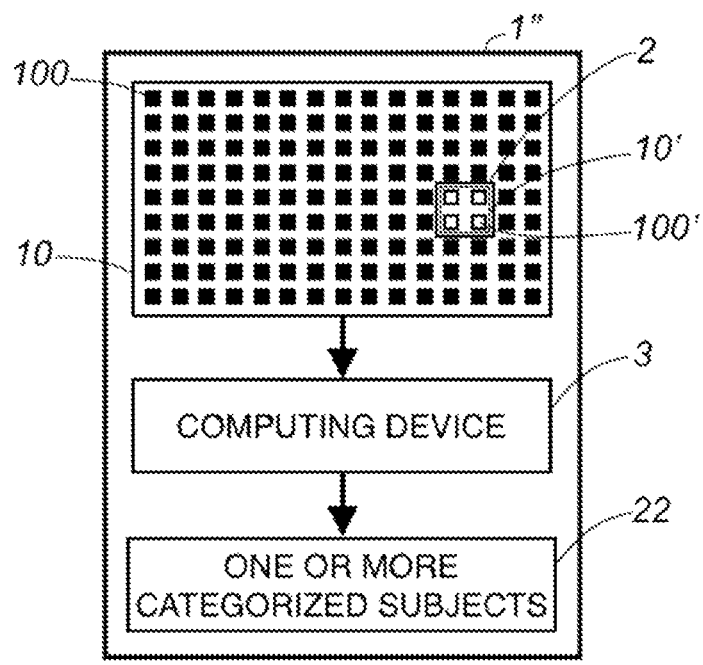

In FIG. 1C, method 1" categorizes one or more subjects in scene 10 resulting in one or more categorized subjects 22. Computing device 3 receives a plurality of data points 100 corresponding to scene 10. Computing device 3 determines a subset of data points 100' indicative of sub-scene 10' displayed on display device 2, and categorizes one or more subjects in scene 10 and disregards sub-scene 10'.

Figure 1D:
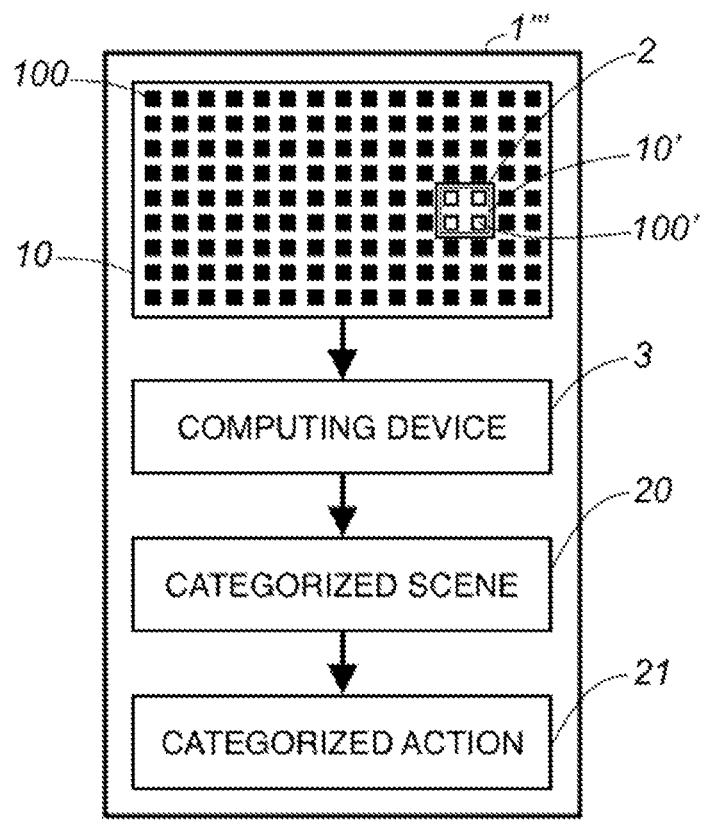

In FIG. 1D, method 1''' categorizes a scene 10 resulting in a categorized scene 20 and a categorized action 21. Computing device 3 receives a plurality of data points 100 corresponding to scene 10. Computing device 3 determines a subset of data points 100' indicative of sub-scene 10' displayed on display device 2, and categorizes scene 10 while disregarding sub-scene 10', wherein a categorized action 21 is deducted from a categorized scene 20.

In another method a categorized scene 20 is deducted from one or more categorized actions (21). For example, a box match scene with various billboards can be categorized directly or can be categorized by the activity or series of actions by boxers fighting in a ring.

In yet another method a categorized scene 20 is deducted from one or more categorized subjects (22). For example, a box match scene with various billboards can be categorized directly or can be categorized by a one or more subjects such as a boxing ring, boxers, trainers, crowd and various attributes in scene 10.

The methods (1, 1', 1" and 1''') may include one or more operations, functions, or actions as depicted in FIGS. 1A-D and may result in one or more categorized objects as depicted by the blocks 20, 21 and 22. Although the blocks 20, 21 and 22 are depicted in a sequential order, these blocks may in some instances be performed in parallel, and/or in a different order than those described herein. Also, the various blocks may be combined into fewer blocks, divided into additional blocks, and/or removed based upon the desired implementation.

In addition, for the methods (1, 1', 1" and 1''') and other processes and methods disclosed herein, the flow charts show functionality and operation of possible implementations of embodiments. In this regard, each method may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and random-access memory (RAM). The computer readable medium may also include non-transitory media or memory, such as secondary or persistent long-term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

Figure 4:
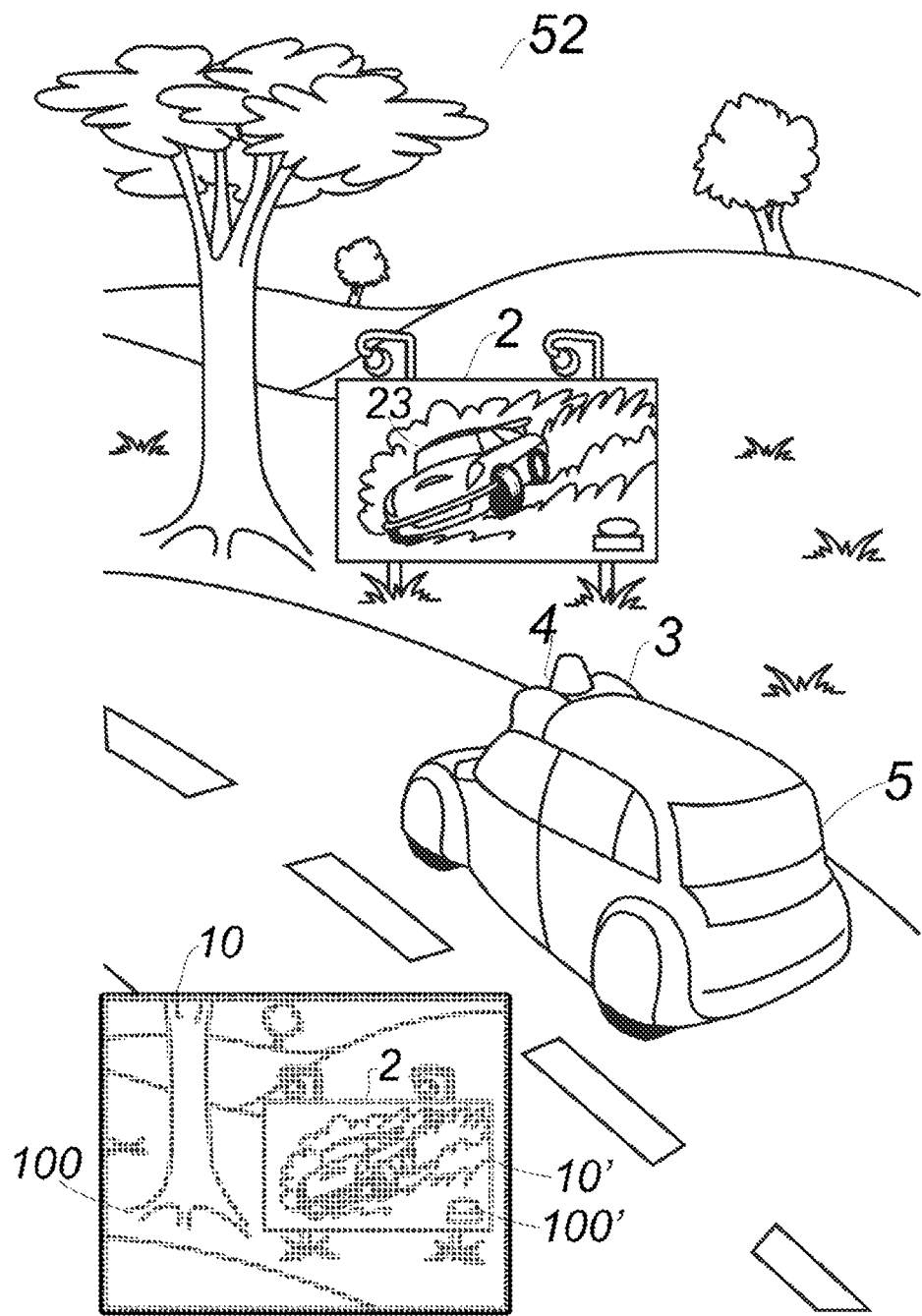
FIG. 4 schematically depicts an embodiment built into a self-driving car analyzing a scene comprising a billboard.

In addition, for the methods (1, 1', 1" and 1''') and other processes and methods disclosed herein, computing device 3 may represent circuitry that is wired to perform the specific logical functions in the process. For the sake of example, the methods (1, 1', 1" and 1''') shown in FIGS. 1A-D will be described as implemented by an example computing device, such as the computing device 3 depicted in FIG. 2. The methods (1, 1', 1" and 1''') can also be described as implemented by an autonomous vehicle, as depicted in FIG. 4, as the computing device may be onboard the vehicle or may be off-board but in wireless communication with the vehicle. It should be understood that other entities or combinations of entities can implement one or more steps of the example methods (1, 1', 1" and 1''').

Figure 2:
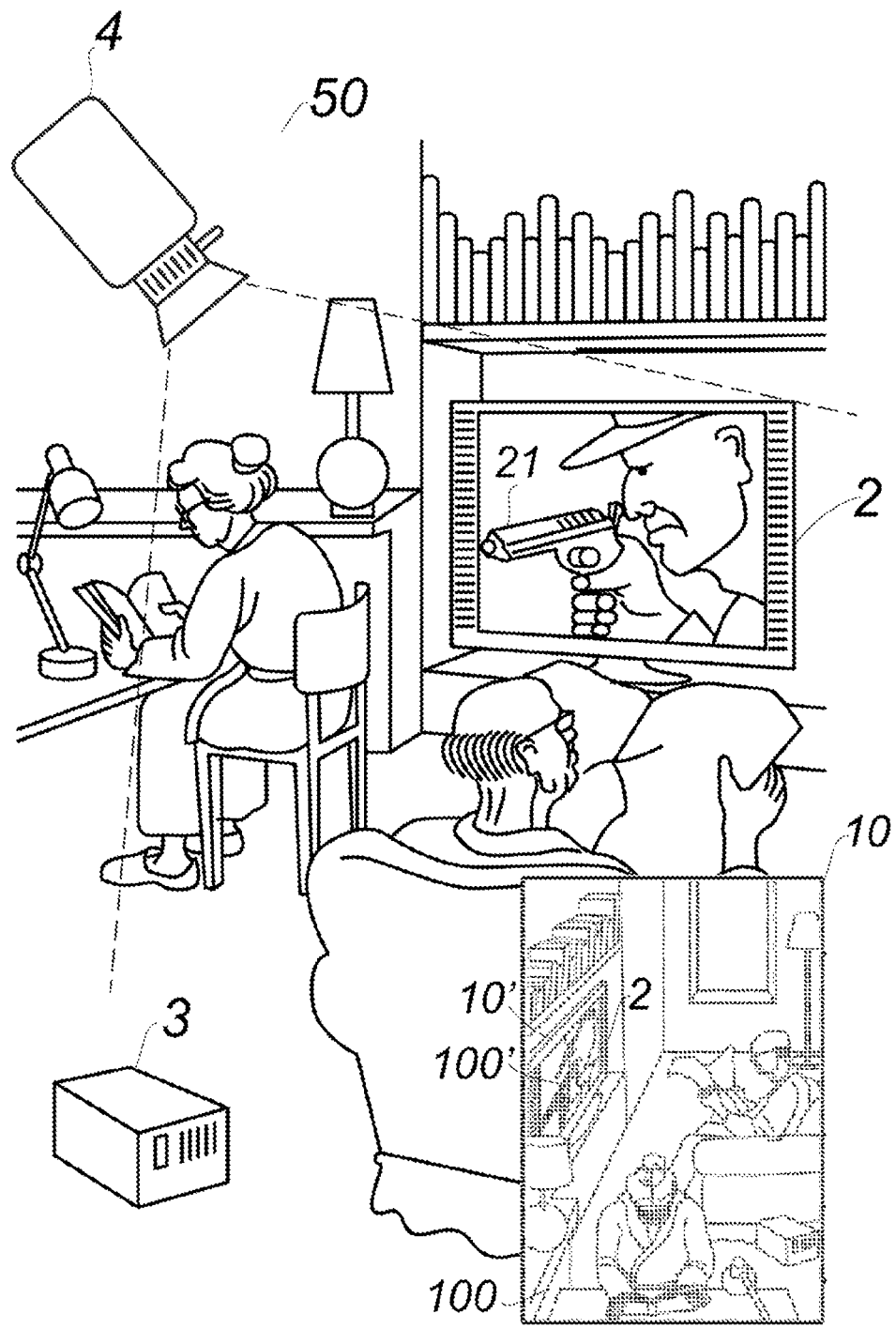
FIG. 2 schematically depicts an embodiment for monitoring the indoors of an elderly home with a television display.

FIG. 2 schematically depicts an application of an embodiment for monitoring an indoors scene of an elderly home 50. In the indoors scene of elderly home 50 there is a television, as display device 2. A video camera, as image capturing device 4, captures scene 10 and transmits its data points 100 including sub-scene 10' with data points 100' to computing device 3, operationally coupled to video camera 4. Although scene 10 comprises a man with a gun 21, computing device 3 does not categorizes scene 10 in FIG. 2 as threatening or as a crime scene since computing device 3, when categorizing the scene, is trained to disregard the data points 100' of sub-scene 10' displayed on the television 2.

In another application computing device is categorizing, within scene 10, an action, a pose, a subject or a combination thereof.

Figure 3:
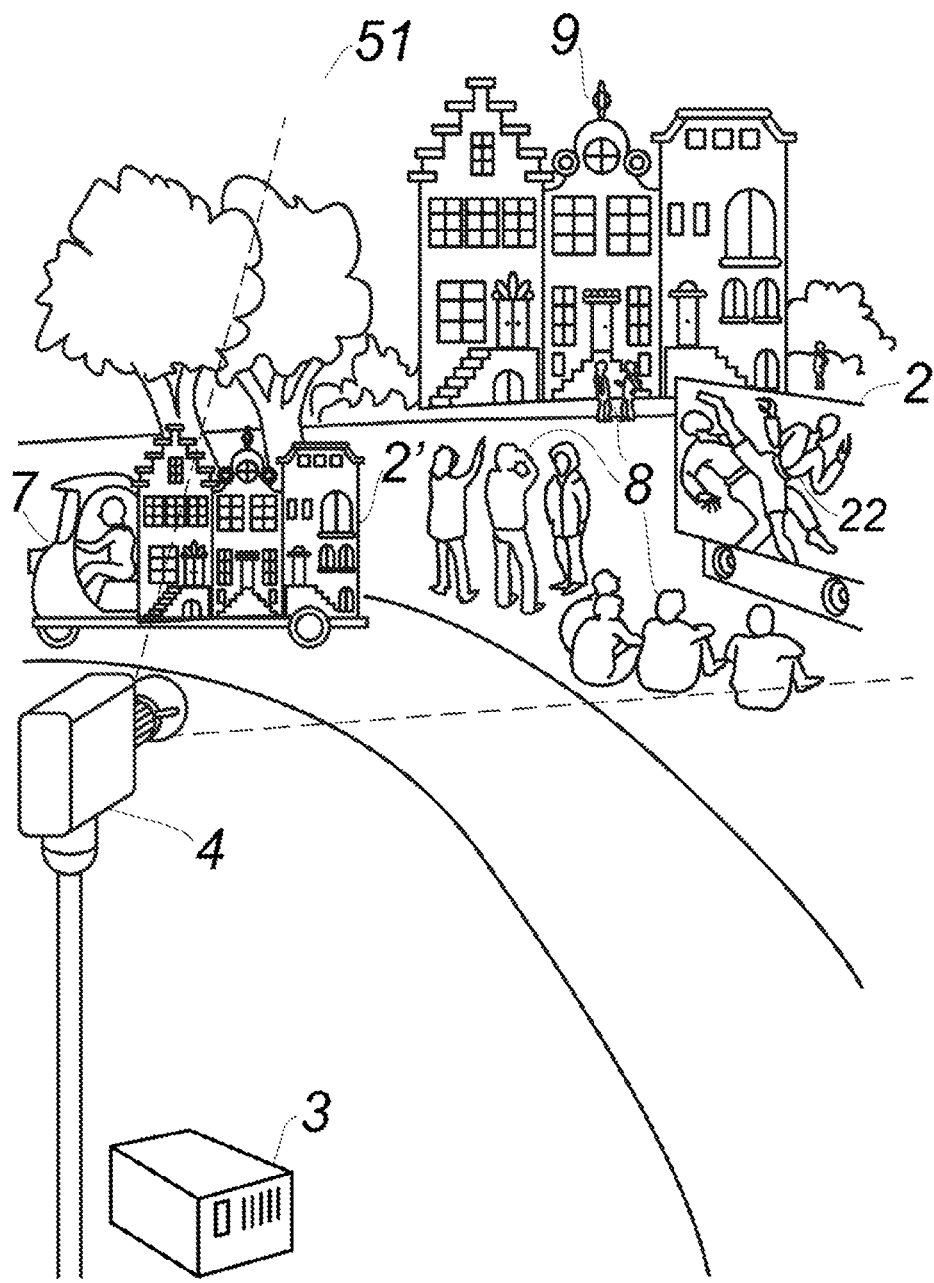
FIG. 3 schematically depicts an embodiment for monitoring a square with display devices.

FIG. 3 schematically depicts an application of an embodiment for monitoring an outdoors scene of a square 51. In the outdoors scene of square 51 there is a wide screen, as display device 2 and a merchandise wagon 7 with a display device 2'. A video camera, as image capturing device 4, monitors the square and is operationally coupled to computing device 3. Similar to the indoors example of FIG. 2, the monitoring of an outdoors scene of square 51 is complicated by the display devices (2 and 2'). Wide screen 2 is showing a fighting scene 22 while the display device 2' on the merchandise wagon 7 shows similar architecture as the surroundings of the square.

In this application, computing device 3, when categorizing the people 8 on the square, will, by disregarding the sub-scene on wide screen 2, deduct that the number of people on the square in view of camera 4 is nine. For instance, such information can be used for monitoring and controlling a crowd in an open space.

Additional in this application, computing device 3, when categorizing the houses 9 on the square, will, by disregarding the sub-scene on display device 2', deduct that the number of houses in view of camera 4 is three and by doing so, it will also increase the correct categorization for merchandise wagon 7 since computing device 3 is not misled by the display device 2'.

Would this application serve as a surveillance system then the system of FIG. 3 would not trigger an alarm for an alleged fighting incident 22 as displayed on the wide screen (display device 2). Adjacent, the surveillance system could trigger an alarm for merchandise wagon 7 for trespassing the square by an unauthorized vehicle.

FIG. 4 schematically depicts an embodiment built into a self-driving car 5 analyzing a scene 10 comprising a billboard, as display device 2. Computing device 3 is operationally coupled with image capturing device 4 and receives a plurality of data points 100 corresponding to scene 10. Computing device 3 determines a subset of data points 100' indicative of sub-scene 10' displayed on billboard 2, categorizes scene 10 and disregards sub-scene 10'. As a result the self-driving car 5 will not be misled by the image of car 23 on billboard 2.

The billboard 2 can be a traditional poster, a digital billboard or a screen configured to display a static image, a (time) series of images, or a video movie.

Further, an example system may take the form of a non-transitory computer-readable medium, which has program instructions stored thereon that are executable by at least one processor to provide the functionality described herein.

An example system may take the form of any vehicle or a subsystem of any vehicle that includes such a non-transitory computer-readable medium having such program instructions stored thereon. Therefore, the terms "computing device" and "autonomous vehicle" can be interchangeable herein. However, in some examples, the computing device may be configured to control the vehicle in an autonomous or semi-autonomous operation mode.

In yet another application, an embodiment is built into a robot so the robot will correctly interpreter its surrounding and the scene wherein the robot is operating.

It may be readily understood that certain aspects of the disclosed systems and methods can be arranged and combined in a wide variety of different configurations, all of which are contemplated herein.

It will also be clear that the above description and drawings are included to illustrate some embodiments of the invention, and not to limit the scope of protection. Starting from this disclosure, many more embodiments will be evident to a skilled person. These embodiments are within the scope of protection and the essence of this invention and are obvious combinations of prior art techniques and the disclosure of this patent.

The invention claimed is:
1. A method for categorizing a scene, comprising:
a computing device receiving a plurality of data points corresponding to said scene;
the computing device determining one or more subsets of data points from the plurality of data points, wherein said one or more subsets of data points are indicative of at least one sub-scene in said scene, said at least one sub-scene displayed on a display device that is part of said scene, wherein said at least one sub-scene does not represent said scene;

the computing device categorizing said scene, disregarding said at least one sub-scene, wherein the categorizing includes interpreting said scene by a computer vision system such that said at least one sub-scene is not taken into account in the categorizing of said scene.

2. The method of claim 1, wherein said scene is an indoor scene.

3. The method of claim 1, wherein said scene is an outdoor scene.

4. The method of claim 1, wherein said scene comprises a series of subsequent scenes defining said scene.

5. The method of claim 1, wherein said scene comprises a traffic scene from a viewpoint inside a vehicle looking out of said vehicle.

6. A device comprising an AI system for categorizing a scene, said AI system comprising a computing device running a computer program performing:

receiving a plurality of data points corresponding to said scene;

determining one or more subsets of data points from the plurality of data points, wherein said one or more subsets of data points are indicative of at least one sub-scene in said scene, said at least one sub-scene displayed on a display device that is part of said scene, wherein said at least one sub-scene does not represent said scene;

categorizing said scene, said computer program disregarding said at least one sub-scene, wherein the categorizing includes interpreting said scene by a computer vision system such that said at least one sub-scene is not taken into account in the categorizing of said scene.

7. A non-transitory computer readable medium having stored thereon computer program instructions that, when executed by a processor in a computing device, configure the computing device to perform:

receiving a plurality of data points corresponding to a scene;

determining one or more subsets of data points from the plurality of data points, wherein said one or more subsets of data points are indicative of at least one sub-scene in said scene, said at least one sub-scene displayed on a display device that is part of said scene, wherein said at least one sub-scene does not represent said scene;

categorizing said scene, said computer program instructions disregarding said at least one sub-scene, wherein the categorizing includes interpreting said scene by a computer vision system such that said at least one sub-scene is not taken into account in the categorizing of said scene.

8. An AI system comprising a computing device executing the computer program instructions of claim 7.

9. An apparatus comprising the AI system of claim 8, wherein said scene comprises a representation of a surrounding of said apparatus comprising said scene, said AI system providing instructions to adjust at least one physical parameter of said apparatus based upon said categorizing of said scene.

10. The apparatus of claim 9, selected from a vehicle and a robot system.

11. A monitoring system comprising the AI system of claim 8, wherein said scene comprises a representation of a surrounding of said monitoring system, said AI system providing a signal based upon said categorizing of said scene.

12. A surveillance system comprising the monitoring system of claim 11.

* * * * *